United States Patent [19]
Kingsbury

[11] Patent Number: 5,572,613
[45] Date of Patent: Nov. 5, 1996

[54] MULTIPLE LIGHTPIPE DEVICE

[75] Inventor: Mary E. Kingsbury, Taylor, Tex.

[73] Assignee: Siemens Rolm Communications Inc., Santa Clara, Calif.

[21] Appl. No.: 400,644

[22] Filed: Mar. 8, 1995

[51] Int. Cl.⁶ ..................................................... G02B 6/28
[52] U.S. Cl. ........................... 385/24; 385/123; 385/115; 385/125
[58] Field of Search .............................. 385/24, 123–126, 385/115–117, 120, 12, 32, 47, 133, 147

[56] References Cited

U.S. PATENT DOCUMENTS 3,753,607  8/1973  Kitano et al. ..................... 385/124 X Primary Examiner—Rodney B. Bovernick
Assistant Examiner—Phan T. H. Palmer

[57] ABSTRACT

A light transmission device includes a multiplicity of lightpipes of differing lengths wherein light output from each of the lightpipes has substantially a same intensity when light applied to an input end of each of the lightpipes has substantially another same intensity. In accordance with a preferred embodiment of the present invention, an area of a surface of the input end of each of the lightpipes is textured and the size of the area which is textured is varies from lightpipe to lightpipe. A method in accordance with the invention transmits light through lightpipes of different lengths. The light transmittivity of each of the lightpipes is regulated so that the light output from each of the lightpipes has substantially the same intensity.

9 Claims, 2 Drawing Sheets

MULTIPLE LIGHTPIPE DEVICE

TECHNICAL FIELD OF THE INVENTION

The present invention pertains to a light transmission device which is comprised of a multiplicity of lightpipes of differing lengths.

BACKGROUND OF THE INVENTION

Present day terminal equipment such as telephones have visible indicators mounted on the surface of the telephone. These visible indicators indicate, for example, that particular telephone keypads or functions are being used. In many telephones, light emitting diodes (LEDs) are used as sources of light for the visible indicators. In this case, light output from an LED is controlled by the telephone electronics and the light output from the LED is transmitted to a visible indicator mounted at the surface of the telephone.

In the prior art, LEDs are mounted relatively close to the surface of the telephone so that light output from an LED only has to travel a short distance through a conductor, for example, a lightpipe, to reach the surface of the telephone. Newer technology used to fabricate telephones sometimes requires mounting LEDs further from the surface of the telephone than was previously the case in the prior art. Further, many newer telephones have a surface which is slanted or rounded. Since the LEDs are typically mounted on a single board, typically they all lie in the same plane. As a result, the distance between an LED and the surface of the telephone is different for different LED-indicator pairs. Despite this difference in distance between an LED and an indicator for different LED-indicator pairs, there is a need for light output from each indicator to have substantially the same intensity when light applied to an input end of each of the lightpipes has substantially the same intensity.

SUMMARY OF THE INVENTION

Advantageously, embodiments of the present invention satisfy the above-identified need in the art by providing a method and device for light transmission. The device comprises multiplicity of lightpipes of differing lengths wherein light output from each of the lightpipes has substantially a same intensity when light applied to an input end of each of the lightpipes has substantially another same intensity. In accordance with a preferred embodiment of the present invention, each lightpipe comprises: (a) a first section, disposed near an input end of the lightpipe, having a substantially constant width; (b) a second section, disposed adjacent the first section, having a width which decreases as distance increases along the lightpipe away from the input end; and (c) a third section, disposed adjacent the second section, having a substantially constant width. Advantageously, the sections having constant width are disposed at the ends of each lightpipe and are utilized to insert the lightpipes into support structures, for example, to insert the input ends of the lightpipes into holes in a circuit board. In addition, the surface of the input end of each lightpipe is textured and, in accordance with the present invention, the amount of the surface of each of the lightpipes that is textured is varied so that light output from each of the light pipes has substantially a same intensity when light applied to the input end of each of the lightpipes has substantially another same intensity. In a method in accordance with the invention, light is transmitted through the device.

DETAILED DESCRIPTION

Figure 1:
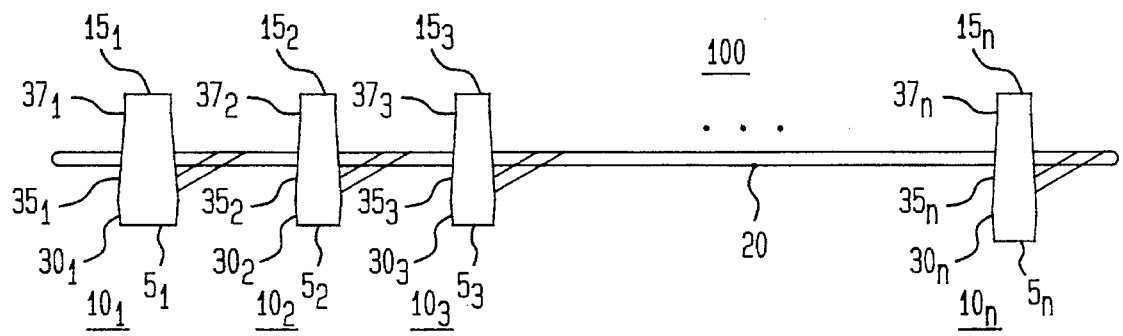
FIG. 1 shows, in pictorial form, a view of a first side of a light transmission device which is comprised of a multiplicity of lightpipes.

FIG. 1 shows, in pictorial form, a view of a first side of light transmission device 100 which is fabricated in accordance with the present invention. As shown in FIG. 1, light transmission device 100 is comprised of a multiplicity of lightpipes $10_1, 10_2, 10_3, \ldots, 10_n$. Each of lightpipes $10_1, 10_2, 10_3, \ldots, 10_n$, has an input end $5_1, 5_2, 5_3, \ldots, 5_n$, respectively, and an output end $15_1, 15_2, 15_3, \ldots, 15_n$, respectively. The light pipes are connected by rod 20 for support. In the preferred embodiment, each of the lightpipes, as well as rod 20, is comprised of injection molded, acrylic plastic.

As is further shown in FIG. 1, each of lightpipes $10_1, 10_2, 10_3, \ldots, 10_n$ comprises: (a) a first section ($30_1, 30_2, 30_3, \ldots, 30_n$, respectively), disposed at an input end ($5_1, 5_2, 5_3, \ldots, 5_n$, respectively) of the lightpipe, having a substantially constant width; (b) a second section ($35_1, 35_2, 35_3, \ldots, 35_n$, respectively), disposed adjacent the first section, having a width which decreases as distance increases along the lightpipe away from the input end; and (c) a third section ($37_1, 37_2, 37_3, \ldots, 37_n$, respectively), disposed adjacent the second section, having a substantially constant width. In accordance with a preferred embodiment of the present invention, the top surfaces $15_1, 15_2, 15_3, \ldots, 15_n$ of each of lightpipes $10_1, 10_2, 10_3, \ldots, 10_n$, respectively, have the same size and are textured to diffuse light and, thereby to help with off-axis viewing. Those of ordinary skill in the art readily appreciate that a matte finish provides one type of textured surface.

Figure 2:
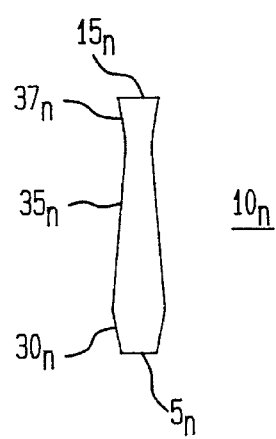
FIG. 2 shows, in pictorial form, a view of second side of one of the lightpipes shown in FIG. 1.

FIG. 2 shows, in pictorial form, a view of a second side of lightpipe $10_n$. As shown in FIG. 2, first section $30_n$ has a constant width, second section $35_n$ has a width which decreases as distance increases along the lightpipe away from input end $5_n$, and third section $37_n$ has a constant width.

Figure 3:
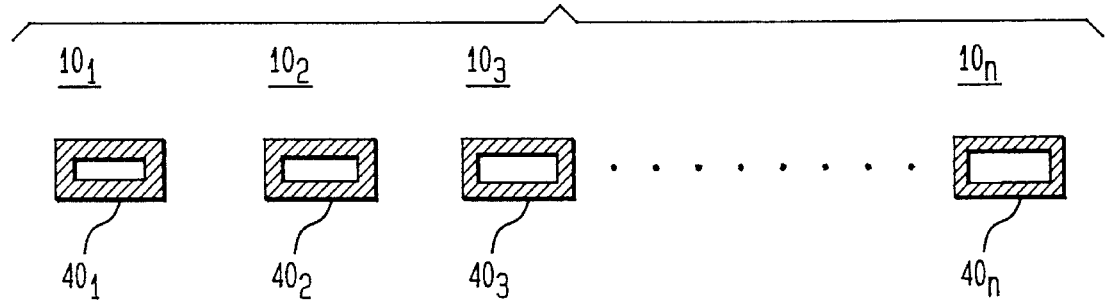
FIG. 3 shows, in pictorial form, a bottom view of a light transmission device which is fabricated in accordance with the present invention.

FIG. 3 is a bottom view of light transmission device 100 which shows the surfaces of input ends $5_1, 5_2, 5_3, \ldots, 5_n$, respectively, of lightpipes $10_1, 10_2, 10_3, \ldots, 10_n$, respectively. As shown in FIG. 3, the surfaces of the input ends include textured areas $40_1, 40_2, 40_3, \ldots, 40_n$, respectively. A textured area is, in this context, in essence, a surface which is not smooth. In accordance with the present invention, the sizes of textured areas $40_1, 40_2, 40_3, \ldots, 40_n$, are adjusted so that light output from each of the lightpipes has substantially a same intensity when light applied to the input end of each of the lightpipes has substantially another same intensity. The use of a textured area on the input surface of the lightpipes is preferred because the entire light transmission assembly, including the textured areas, can be injection molded in one step. This advantageously achieves a substantial cost efficiency.

The textured area decreases the intensity of light input to a lightpipe. As a result, in accordance with the present invention, the textured area on the shorter lightpipes in light transmission device 100 is made larger than the textured area on the longer lightpipes. This is done to compensate for the following effect. Assume that the input surface of two similar lightpipes is smooth. Then, the intensity of light output from the shorter lightpipe will be larger than the intensity of light output from the larger lightpipe when light of the same intensity is applied to the input end of both.

Figure 4:
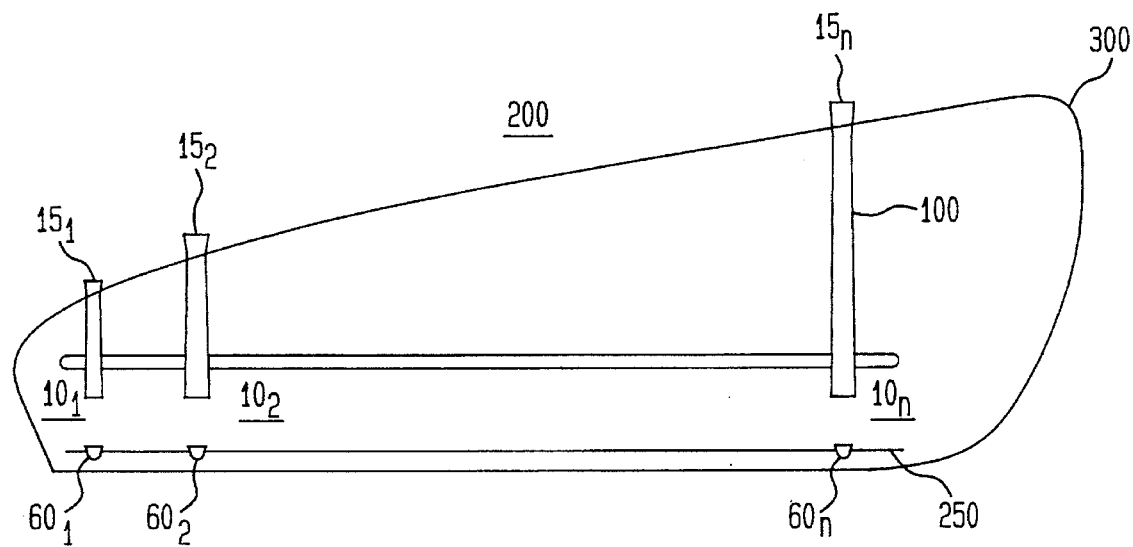
FIG. 4 shows, in pictorial form, a cutaway view of a telephone which utilizes the inventive light transmission device.

FIG. 4 shows, in pictorial form, a cutaway view of telephone 200 which utilizes inventive light transmission device 100. As shown in FIG. 4, top surface 300 of telephone 200 is rounded and LEDs $60_1, 60_2, 60_3, \ldots, 60_n$ are mounted on board 250. Output ends $15_1, 15_2, 15_3, \ldots, 15_n$ of light transmission device 100 extend through holes in top surface 300 of telephone 200 and, thereby, act as visible indicators for various keypads and functions. The intensity of light output from each of LEDs $60_1, 60_2, 60_3, \ldots, 60_n$ is substantially the same.

In a method in accordance with the present invention, light is transmitted using a plurality of lightpipes. A first portion of light is transmitted through a first lightpipe as a first portion of light enters the surface of an input end of a lightpipe including a more transmissive area and a less transmissive area, and travels to an output end; and a second portion of light is transmitted through a second, longer lightpipe as a second portion of light enters a surface of an input end of a second lightpipe, the surface of the second lightpipe including a more transmissive area and a less transmissive area, and travels to an output end. The less transmissive area of the second lightpipe is larger than the less transmissive area of the first lightpipe, so that the light output from each of the lightpipes is of substantially the same intensity.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. In particular, although the above-described embodiment comprised lightpipes having input ends with a textured surface, the present invention is not so limited. Other embodiments of the present invention may be fabricated wherein the surfaces of the input ends are coated with materials that either diffuse light or are impenetrable to light. For example, in an alternate embodiment of the present invention, portions of the bottom surface of the input end of the lightpipes have an area with different geometric shapes of textured area.

What is claimed is:

1. A light transmission device which is comprised of a multiplicity of lightpipes of differing lengths, each of the lightpipes having an input end and an output end;
   a surface of the input end of the lightpipes is comprised of at least two areas, wherein a first area is less transmissive to light than another of the at least two areas, wherein the size of the first area is different for lightpipes of differing lengths;
   wherein one of the lightpipes is shorter than another one of the lightpipes and wherein the size of the first area of the shorter lightpipe is larger than the size of the first area for the another one of the lightpipes.

2. The light transmission device of claim 1 wherein the first area is textured.

3. The light transmission device of claim 2 wherein one or more of the light pipes comprise:

a first section, disposed near the input end of the lightpipe, having a substantially constant width;
   a second section, disposed adjacent the first section, having a width which decreases along the lightpipe away from the input end; and
   a third section, disposed adjacent the second section, having a substantially constant width.

4. A light transmission device comprising:
   a plurality of lightpipes, the plurality of lightpipes including:
      a first lightpipe having an input end and an output end, a surface of the input end including a first area and a second area, the first area being less transmissive to light than the second area; and
      a second lightpipe having an input end and an output end, a surface of the input end of the second lightpipe including a first area and a second area, the first area of the second lightpipe being less transmissive to light than the second area of the second lightpipe;
   wherein the first lightpipe is shorter than the second lightpipe and wherein the size of the first area of the first lightpipe is larger than the size of the first area of the second lightpipe.

5. The light transmission device of claim 4 wherein the first area of the first lightpipe and the first area of the second lightpipe are textured.

6. The light transmission device of claim 4 wherein the first lightpipe additionally includes:
   a first section, which includes the input end of the first lightpipe, the first section having a substantially constant width;
   a second section, adjacent to the first section, having a width which decreases along the first lightpipe away from the input end of the first lightpipe; and
   a third section, adjacent to the second section, having a substantially constant width.

7. A method for transmitting light comprising the step of:
   (a) transmitting light using a plurality of lightpipes so that intensity of the light at an output of each of the plurality of lightpipes is approximately equal, including the following substeps:
      (a.1) transmitting a first portion of the light through a first lightpipe, including the following substeps,
         (a.1.1) entering, by the first portion of the light, the first lightpipe through a surface of an input end, the surface including a first area and a second area, the first area being less transmissive to light than the second area, and,
         (a.1.2) traveling, by the first portion of light, from the input end of the first lightpipe to an output end; and
      (a.2) transmitting a second portion of the light through a second lightpipe, the second lightpipe being longer than the first lightpipe, including the following substeps,
         (a.2.1) entering, by the second portion of the light, the second lightpipe through a surface of an input end of the second lightpipe, the surface of the second lightpipe including a first area and a second area, the first area of the second lightpipe being less transmissive to light than the second area of the second lightpipe, wherein the size of the first area of the first lightpipe is larger than the size of the first area of the second lightpipe, and
         (a.2.2) traveling, by the second portion of light, from the input end of the second lightpipe to an output end of the second lightpipe.

8. The method of claim 7 wherein in substep (a.1.1) the first area of the first lightpipe is textured and in substep (a.2.1) the first area of the second lightpipe is textured.

9. The method of claim 7 wherein substep (a.1.2) includes the following substeps:

traveling, by the first portion of the light, through a first section of the first lightpipe, the first section having a substantially constant width;

traveling, by the first portion of the light, through a second section of the first lightpipe, the second section having a width which decreases along the first lightpipe away from the input end of the first lightpipe; and traveling, by the first portion of the light, through a third section of the first lightpipe, the third section having a substantially constant width.

\* \* \* \* \*